(12) United States Patent
Nakayama

(10) Patent No.: US 11,919,441 B2
(45) Date of Patent: Mar. 5, 2024

(54) LAMP CONTROL DEVICE

(71) Applicant: Rohm Co., Ltd., Kyoto (JP)

(72) Inventor: Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 394 days.

(21) Appl. No.: 17/298,807

(22) PCT Filed: Dec. 2, 2019

(86) PCT No.: PCT/JP2019/046996
§ 371 (c)(1),
(2) Date: Jun. 1, 2021

(87) PCT Pub. No.: WO2020/121864
PCT Pub. Date: Jun. 18, 2020

(65) Prior Publication Data
US 2022/0055538 A1    Feb. 24, 2022

(30) Foreign Application Priority Data

Dec. 14, 2018   (JP) .................................. 2018-234402
Mar. 27, 2019   (JP) .................................. 2019-061305

(51) Int. Cl.
*B60Q 11/00*       (2006.01)
*B60Q 1/00*        (2006.01)
(Continued)

(52) U.S. Cl.
CPC .......... *B60Q 11/005* (2013.01); *B60Q 1/0094* (2013.01); *B60Q 1/382* (2013.01); *B62J 6/056* (2020.02); *H05B 45/58* (2020.01)

(58) Field of Classification Search
None
See application file for complete search history.

(56) References Cited

U.S. PATENT DOCUMENTS 9,986,616 B2 *    5/2018   Hong .................... F21S 43/14
2007/0194759 A1   8/2007   Shimizu et al.
(Continued)

FOREIGN PATENT DOCUMENTS

BR    102013021176        12/2014
CN       101026316         8/2007
(Continued)

OTHER PUBLICATIONS

IN Office Action in Indian Appln. No. 202117025271, dated Nov. 23, 2022, 6 pages (with English Translation).
(Continued)

*Primary Examiner* — Adolf Dsouza
(74) *Attorney, Agent, or Firm* — Fish & Richardson P.C.

(57) ABSTRACT

A lamp control device comprises a first input terminal, a second input terminal, an output terminal that is configured to be connectable to a lamp via an external switch and outputs a drive current for the lamp, an internal switch provided on a first path connecting the first input terminal and the output terminal, a constant current section provided on a second path connecting the second input terminal and the output terminal, a voltage monitoring section that monitors a voltage applied to the output terminal, and a control section that controls the internal switch on the basis of a monitoring result from the voltage monitoring section.

13 Claims, 10 Drawing Sheets

(51) Int. Cl.
*B60Q 1/38* (2006.01)
*B62J 6/056* (2020.01)
*H05B 45/58* (2020.01)

(56) References Cited

U.S. PATENT DOCUMENTS

| | | |
|---|---|---|
| 2012/0001546 A1 | 1/2012 | Takeuchi et al. |
| 2013/0147377 A1 | 6/2013 | Kubota et al. |
| 2013/0335095 A1 | 12/2013 | Kiuchi |
| 2014/0055031 A1 | 2/2014 | Miyamoto et al. |
| 2017/0118818 A1 | 4/2017 | Tsuchiya et al. |
| 2017/0303352 A1 | 10/2017 | Hong et al. |
| 2018/0217206 A1 | 8/2018 | Kiuchi |

FOREIGN PATENT DOCUMENTS

| | | | |
|---|---|---|---|
| CN | 103444046 | 12/2013 | |
| CN | 104040889 | 9/2014 | |
| CN | 108601162 | 9/2018 | |
| EP | 2640166 A1 * | 9/2013 | ............ H05B 37/02 |
| EP | 2775617 | 9/2014 | |
| JP | 2013071593 A * | 4/2013 | |
| JP | 2014040142 | 3/2014 | |
| JP | 2017214017 | 12/2017 | |
| TW | I449467 | 8/2014 | |
| WO | WO 2013065106 | 5/2013 | |
| WO | WO 2015151204 | 10/2015 | |

OTHER PUBLICATIONS

PCT International Search Report in International Appln. No. PCT/JP2019/046996, dated Jan. 28, 2020, 4 pages (with English Translation).

\* cited by examiner

LAMP CONTROL DEVICE

TECHNICAL FIELD

This invention relates to lighting control for a lamp provided on a vehicle (for example, a flasher lamp on a motorcycle).

BACKGROUND ART

A lamp control device which controls the lighting of flasher lamps provided on a vehicle performs lighting control for the flasher lamps in accordance with the state of a flasher switch operated by a driver.

A flasher switch provided on a motorcycle is, unlike a flasher switch provided on a four-wheeled vehicle, used in an environment where it is exposed to weather. Accordingly, a flasher switch provided on a motorcycle is far more likely than one provided on a four-wheeled vehicle to suffer a leakage current due to raindrops, dust, etc. even when it is off.

Thus, in lamp control devices for controlling the lighting of flasher lamps provided on motorcycles in particular, demand is high for the capability to suppress unintended lighting of lamps due to a leakage current.

LIST OF CITATIONS

Patent Literature

Patent Document 1: Japanese unexamined patent application publication No. 2017-214017

SUMMARY OF THE INVENTION

Problem to be Solved by the Invention

In view of the demand mentioned above, the lamp control device proposed in Patent Document 1 stops the blinking of a lamp upon detecting that the current that passes through the flasher switch is a leakage current, and thereby suppresses unintended lighting of the lamp due to the leakage current.

The lamp lighting system according to the second embodiment disclosed in Patent Document 1 is configured such that a resistor is connected in parallel with a lamp. With this configuration, even when there is variation in the forward voltages of LEDs used as lamps or in the supply voltage fed to the lamp control device, it is possible to reduce an error in the current that passes through the flasher switch. As a result, it is possible to improve accuracy in monitoring the resistance value of the flasher switch.

However, with the system described above, it is not possible to reduce the power loss due to a leakage current if there is any.

In the lamp control device proposed in Patent Document 1, the threshold voltage of the digital transistor provided in the input stage and the Zener voltage of the Zener diode provided in the level adjuster affect the determination of whether the current passing through the flasher switch is a leakage current or not. That is, with the lamp control device proposed in Patent Document 1, because of variation in the threshold voltage of the digital transistor mentioned above and variation in the Zener voltage of the Zener diode mentioned above, it is not possible to accurately suppress unintended lighting of a lamp due to a leakage current.

In view of the circumstances described above, a first object of the present invention is to provide a lamp control device which can suppress unintended lighting of a lamp due to a leakage current and which also can reduce the power loss due to a leakage current when there is any.

In view of the circumstances described above, a second object of the present invention is to provide a lamp control device which can accurately suppress unintended lighting of a lamp due to a leakage current.

Means for Solving the Problem

According to one aspect of what is disclosed herein, a lamp control device includes: a first input terminal; a second input terminal; an output terminal configured to be connectable to a lamp via an external switch, the driving current for the lamp being output via the output terminal; an internal switch arranged on a first path connecting together the first input terminal and the output terminal; a constant current circuit arranged on a second path connecting together the second input terminal and the output terminal; a voltage monitor configured to monitor the voltage fed to the output terminal; and a controller configured to control the internal switch based on the result of monitoring by the voltage monitor (a first configuration).

In the lamp control device according to the first configuration described above, the controller may be configured to start switching alternately between first and second control modes when the voltage fed to the output terminal is lower than a first predetermined value (a second configuration).

In the lamp control device according to the second configuration described above, the controller may be configured to, after starting switching alternately between the first and second control modes, when the voltage fed to the output terminal becomes higher than a second predetermined value, finish switching alternately between the first and second control modes and fix the control mode to the first control mode (a third configuration).

In the lamp control device according to the third configuration described above, the second predetermined value may be higher than the first predetermined value (a fourth configuration).

In the lamp control device according to any one of the second to fourth configurations described above, the controller may be configured to drive the internal switch by PWM in the second control mode (a fifth configuration).

In the lamp control device according to any one of the second to fifth configurations described above, the controller may be configured to make the constant current circuit operate intermittently in the first control mode (a sixth configuration).

In the lamp control device according to any one of the second to sixth configurations described above, the controller may be configured to keep the constant current circuit out of operation in the second control mode (a seventh configuration).

According to another aspect of what is disclosed herein, a lamp system includes the lamp control device according to any one of the first to seventh configurations, the external switch, and the lamp (an eighth configuration).

The lamp system according to the eighth configuration may further include first and second resistors. An input voltage may be fed to one terminal of the first resistor and to one terminal of the second resistor, the other terminal of the first resistor may be connected to the first input terminal, the other terminal of the second resistor may be connected to the second input terminal, and the resistance value of the second resistor may be higher than the resistance value of the first resistor (a ninth configuration).

According to yet another aspect of what is disclosed herein, a vehicle includes the lamp system according to the eighth or ninth configuration and a battery as a power source for the lamp system (a tenth configuration).

In the vehicle according to the tenth configuration described above, the vehicle may be a motorcycle, the switch may be a flasher switch, and the lamp may be a flasher lamp (an eleventh configuration).

According to yet another aspect of what is disclosed herein, a lamp control device includes: an output terminal configured to let a lamp driving current be output via it; a comparator; and a first setter configured to set the voltage fed to a first input terminal of the comparator to a second voltage that depends on a first voltage or to a third voltage that depends on a first current. The output terminal is connected to a second input terminal of the comparator. The output terminal is configured to be connectable to the lamp via a switch. The output terminal is configured to be connectable to a second setter including the switch. When the first setter sets the voltage fed to the first input terminal of the comparator to the second voltage, the second setter sets the voltage fed to the output terminal to a fourth voltage that depends on the first voltage and the resistance value of the switch. When the first setter sets the voltage fed to the first input terminal of the comparator to the third voltage, the second setter sets the voltage fed to the output terminal to a fifth voltage that depends on the first current and the resistance value of the switch (a twelfth configuration).

In the lamp control device according to the twelfth configuration described above, when the lamp control device keeps the lamp off, the second setter may set the voltage fed to the output terminal to the fourth or fifth voltage (a thirteenth configuration).

In the lamp control device according to the twelfth or thirteenth configuration described above, the first setter may set the voltage fed to the first input terminal of the comparator to the second voltage. The second setter may set the voltage fed to the output terminal to the fourth voltage. The second setter may include a pull-up resistor configured to be, at one terminal, connectable to the output terminal and, at the other terminal, capable of being fed with the first voltage (a fourteenth configuration).

In the lamp control device according to any one of the twelfth to fourteenth configurations described above, the first voltage may be the input voltage to the lamp control device (a fifteenth configuration).

According to yet another aspect of what is disclosed herein, a lamp system includes the lamp control device according to any one of the twelfth to fifteenth configurations, the switch, the lamp, and the second setter (a sixteenth configuration).

According to yet another aspect of what is disclosed herein, a vehicle includes the lamp system according to the sixteenth configuration and a battery as a power source for the lamp system (a seventeenth configuration).

In the vehicle according to the seventeenth configuration described above, the vehicle may be a motorcycle, the switch may be a flasher switch, and the lamp may be a flasher lamp (an eighteenth configuration).

Advantageous Effects of the Invention

According to one aspect of the invention disclosed herein, it is possible to provide a lamp control device which can suppress unintended lighting of a lamp due to a leakage current and which also can reduce the power loss due to a leakage current if there is any.

According to another aspect of the invention disclosed herein, it is possible to provide a lamp control device which can accurately suppress unintended lighting of a lamp due to a leakage current.

DESCRIPTION OF EMBODIMENTS

1. First Embodiment 1-1. Configuration of a Lamp System

Figure 1:
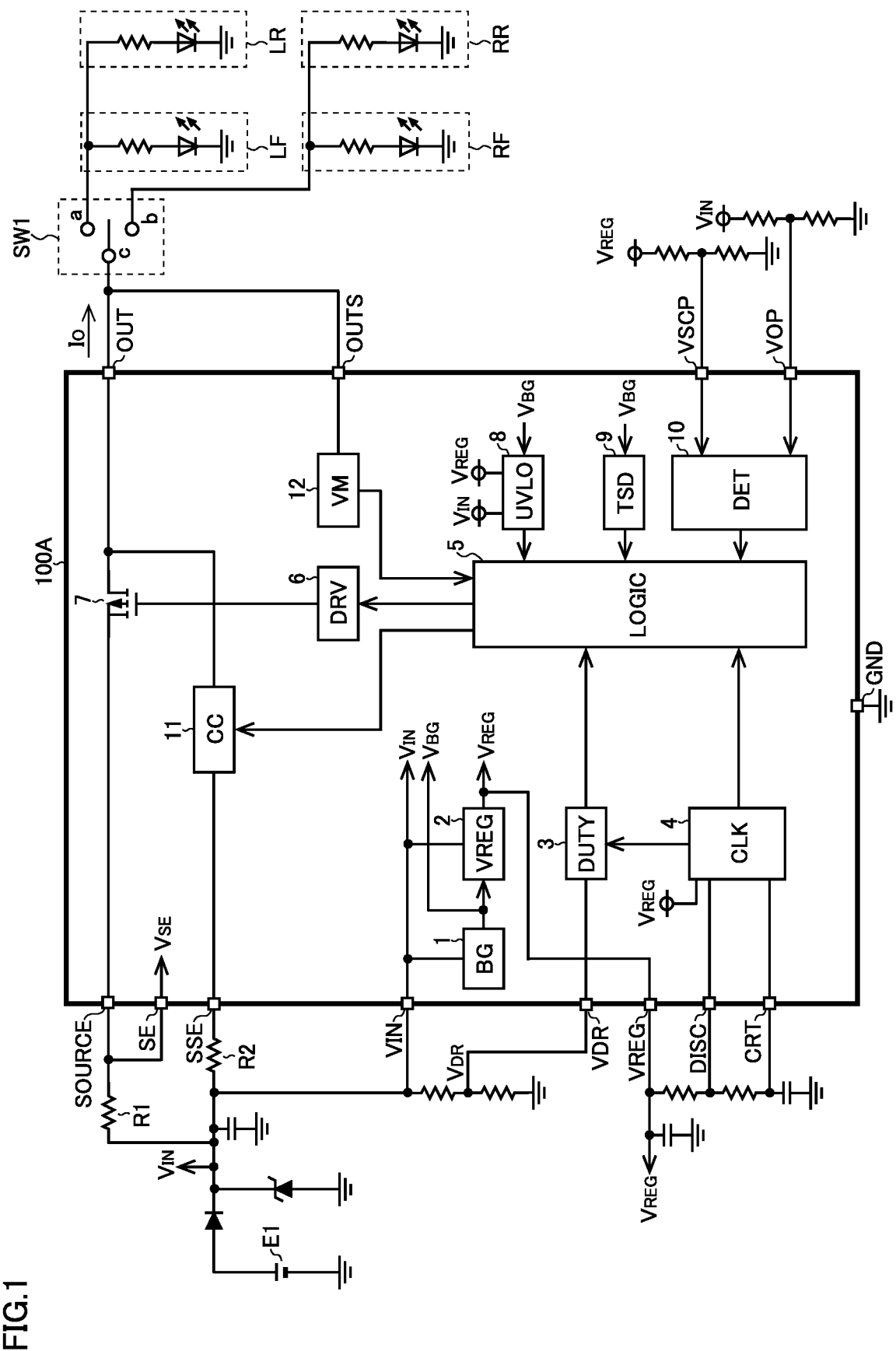
FIG. 1 is a diagram showing one configuration example of a lamp system.

FIG. 1 is a diagram showing one configuration example of a lamp system. The lamp system of this configuration example includes a lamp control device 100A and externally fitted components which are externally connected to the lamp control device 100A. The externally fitted components include a switch SW1, a left-front lamp module LF, a left-rear lamp module LR, a right-front lamp module RF, and a right-rear lamp module RR. The lamp modules each include an LED (light emitting diode). Although FIG. 1 shows a configuration where each lamp module includes one LED, a configuration is also possible where each lamp module includes a plurality of LEDs.

The lamp control device 100A is a semiconductor integrated circuit device (what is called an LED driver IC) which receives a voltage fed from a battery E1 to feed an output current to each lamp module, and includes a plurality of external terminals for establishing electrical connection with outside the device.

A negative pole (anode) of the battery E1 is connected to a grounded terminal. A positive pole (cathode) of the battery E1 is connected to the anode of a reverse current prevention diode. The cathode of a reverse current prevention diode is connected to the external terminal VIN.

The external terminal VIN is fed with an input voltage $V_{IN}$ (≈the output voltage of the battery E1) is fed. The external terminals SOURCE and SE are fed with the input voltage $V_{IN}$ via a resistor R1. The external terminal VDR is fed with a division voltage of the input voltage $V_{IN}$. The external terminal SSE is fed with the input voltage $V_{IN}$ via a resistor R2. The current that passes across the path connecting together the external terminals SSE and OUT is set to be lower than the current that passes across the path connecting together the external terminals SOURCE and OUT, and accordingly it is preferable that the resistance value of the resistor R2 be higher than that of the resistor R1.

A constant voltage $V_{REG}$ that is generated within the lamp control device 100A is output via the external terminal VREG. To the external terminals DISC and CRT, a CR circuit for determining a blinking period of a lamp is connected.

The external terminal GND is fed with a ground potential.

The external terminal VSCP is fed with a voltage that indicates a detection threshold value for short-circuit fault detection. The external terminal VOP is fed with a voltage that indicates a detection threshold value for open-circuit fault detection.

A common contact c of the switch SW1 is connected to the external terminals OUT and OUTS. The external terminal OUT is an output terminal via which to output a lamp driving current $I_O$. The external terminal OUTS is a terminal via which to monitor the voltage fed to the external terminal OUT. A contact a of the switch SW1 is connected to the left-front and left-rear lamp modules LF and LR. A contact b of the switch SW1 is connected to the right-front and right-rear lamp modules RF and RR.

Thus, to turn on the left-front and left-rear lamp modules LF and LR, the switch SW1 needs to be operated in advance so as to connect together the common contact c and the contact a. Likewise, to turn on the right-front and right-rear lamp modules RF and RR, the switch SW1 needs to be operated in advance so as to connect together the common contact c and the contact b. Unless operated, the switch SW1 has the common contact c unconnected to either the contact a or the contact b as shown in FIG. 1.

The left-front, right-front, left-rear, and right-rear lamp modules LF, RF, LR, and RR are each a series circuit of a current limiting resistor and an LED.

1-2. Internal Configuration of the Lamp Control Device

With reference still to FIG. 1, the internal configuration of the lamp control device 100A will be described. The lamp control device 100A has integrated in it a band-gap reference voltage generator 1, a constant voltage generator 2, a duty controller 3, a clock generator 4, a logic circuit 5, a driver 6, a PMOS (p-channel metal-oxide-semiconductor) transistor 7, an undervoltage malfunction preventer 8, an overheat protector 9, a fault detector 10, a constant current circuit 11, and a voltage monitor 12.

The band-gap reference voltage generator 1 generates a reference voltage $V_{BG}$ using the input voltage $V_{IN}$ that is fed to the external terminal $V_{IN}$, to feed the reference voltage $V_{BG}$ to different parts in the lamp control device 100A.

The constant voltage generator 2 generates a constant voltage $V_{REG}$ using the reference voltage $V_{BG}$, to feed the constant voltage $V_{REG}$ to different parts in the lamp control device 100A.

The duty controller 3 controls the on-duty of a PWM (pulse width modulation) signal in accordance with a voltage $V_{DR}$ (which is a division voltage of the input voltage $V_{IN}$) that is fed to the external terminal VDR. Specifically, the duty controller 3 feeds the logic circuit 5 with, as a PWM signal, the result of comparison (in the form of a binary signal) of the voltage $V_{DR}$ with a triangular-wave voltage of a fixed period that is generated by the clock generator 4.

The clock generator 4 generates a clock signal and the triangular-wave voltage, both of a fixed period, to feed the clock signal of the fixed period to the logic circuit 5 and the triangular-wave voltage of the fixed period to the duty controller 3.

The logic circuit 5 controls the switching of the PMOS transistor 7. Specifically, the logic circuit 5 feeds a control signal to the driver 6, and the driver 6 drives the PMOS transistor 7 in accordance with the control signal from the logic circuit 5.

When performing blinking control for a lamp, the logic circuit 5 alternates between a first control mode, in which it keeps the PMOS transistor 7 off during a period corresponding to M periods of the clock signal, and a second control mode, in which it switches the PMOS transistor 7 on and off in accordance with the PWM signal during a period corresponding to N periods of the clock signal. In the first control mode, the logic circuit 5 keeps the driver 6 out of operation. In the second control mode, the logic circuit 5 drives the PMOS transistor 7 by PWM via the driver 6. Driving the PMOS transistor 7 by PWM makes it easy to turn on the lamp with desired luminance. M and N mentioned above are each a natural number of two or more. M and N mentioned above may equal, or may be different.

When performing lighting inhibition control for a lamp, the logic circuit 5 keeps the PMOS transistor 7 off over the entire period in which lighting of the lamp is inhibited.

The undervoltage malfunction preventer 8, when the input voltage $V_{IN}$ becomes equal to or lower than a predetermined value, locks out the operation of all the circuits in the lamp control device 100A except the constant voltage generator 2.

The overheat protector 9, upon detecting overheating, performs overheat protection operation.

The fault detector 10, upon detecting an open-circuit fault or a short-circuit fault in a lamp, notifies the logic circuit 5 of occurrence of the fault.

The constant current circuit 11 is arranged on the path connecting together the external terminals SSE and OUT and feeds a constant current to the external terminal OUT. The logic circuit 5, to reduce power consumption in the lamp control device 100A, makes the constant current circuit 11 operate intermittently in the first control mode and keeps the constant current circuit 11 out of operation in the second control mode. When making the constant current circuit 11 operate intermittently, the logic circuit 5 makes the constant current circuit 11 operate intermittently based on the clock signal of the fixed period which is fed from the clock generator 4.

The voltage monitor 12 monitors the voltage that is fed to the external terminal OUT. Specifically, the voltage monitor 12 checks whether the voltage fed to the external terminal OUT is lower than the first predetermined value and whether it is higher than the second predetermined value (>the first predetermined value), and notifies the logic circuit 5 of the checking result. When the voltage applied to the external terminal OUT is lower than the first predetermined value, the logic circuit 5 starts switching alternately between the first and second control modes. Thereafter, when the voltage fed to the external terminal OUT becomes higher than the second predetermined value, the logic circuit 5 finishes switching alternately between the first and second control modes and fixes the control mode to the first control mode. In this embodiment, the second predetermined value is chosen to be greater than the first predetermined value so as to give hysteresis between the start and the end of the alternate switching between the first and second control modes. Instead, the first and second predetermined values can be chosen to be equal.

Figure 2:
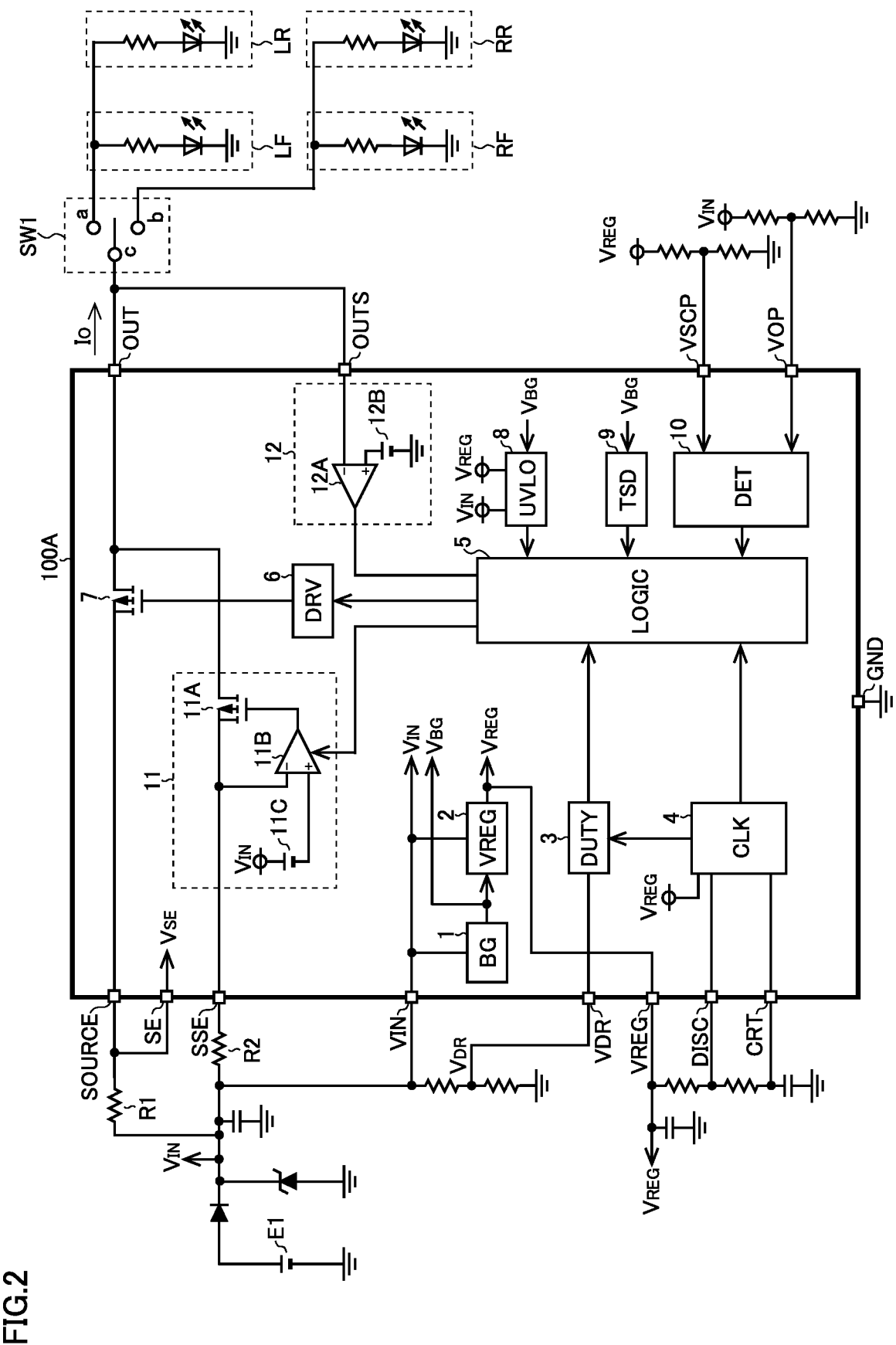
FIG. 2 is a diagram showing one configuration example of a constant current circuit and a voltage monitor.

1-3. Configuration Example of the Constant Current Circuit and the Voltage Monitor FIG. 2 is a diagram showing one configuration example of the constant current circuit 11 and the voltage monitor 12. In FIG. 2, such parts as find their counterparts in FIG. 1 are identified by the same reference signs. The constant current circuit 11 in this configuration example includes a PMOS transistor 11A, an operational amplifier 11B, and a constant voltage source 11C. The voltage monitor 12 in this configuration example includes a comparator 12A and a constant voltage source 12B.

The source of the PMOS transistor 11A and the inverting input terminal of the operational amplifier 11B are connected to the external terminal SSE, and the drain of the PMOS transistor 11A is connected to the external terminal OUT. The input voltage $V_{IN}$ is fed to the positive-pole side of the constant voltage source 11C, and the negative-pole side of the constant voltage source 11C is connected to the non-inverting input terminal of the operational amplifier 11B. The output terminal of the operational amplifier 11B is connected to the gate of the PMOS transistor 11A.

The inverting input terminal of the comparator 12A is connected to the external terminal OUTS. The positive-pole side of the constant voltage source 12B is connected to the non-inverting input terminal of the comparator 12A. The negative-pole side of the constant voltage source 12B is connected to the ground potential. The output signal of the comparator 12A is fed to the logic circuit 5.

The set constant current value of the constant current circuit 11 is the value resulting from dividing the constant voltage value of the constant voltage source 11C by the resistance value of the resistor R2.

The voltage monitor 12 checks whether the voltage applied to the external terminal OUT is lower than the first predetermined value and whether it is higher than the second predetermined value (>the first predetermined value). When the voltage fed to the external terminal OUT is lower than the first predetermined value, the voltage monitor 12, keeps the signal fed to the logic circuit 5 at high level. When, while the voltage fed to the external terminal OUT is higher than the first predetermined value, the voltage fed to the external terminal OUT becomes higher than the second predetermined value, the voltage monitor 12 switches the signal that is fed to the logic circuit 5 from high level to low level.

In the first control mode, the current that passes across the path connecting together the external terminals SSE and OUT is kept as a constant current by the constant current circuit 11. Thus, by reducing the set constant current value of the constant current circuit 11, it is possible to reduce the power loss due to a leakage current if there is any.

Furthermore, in the first control mode, the constant current circuit 11 is operated intermittently, and thus it is possible to further reduce the power loss due to a leakage current if there is any.

1-4. Operation of the Lamp System

Figure 3:
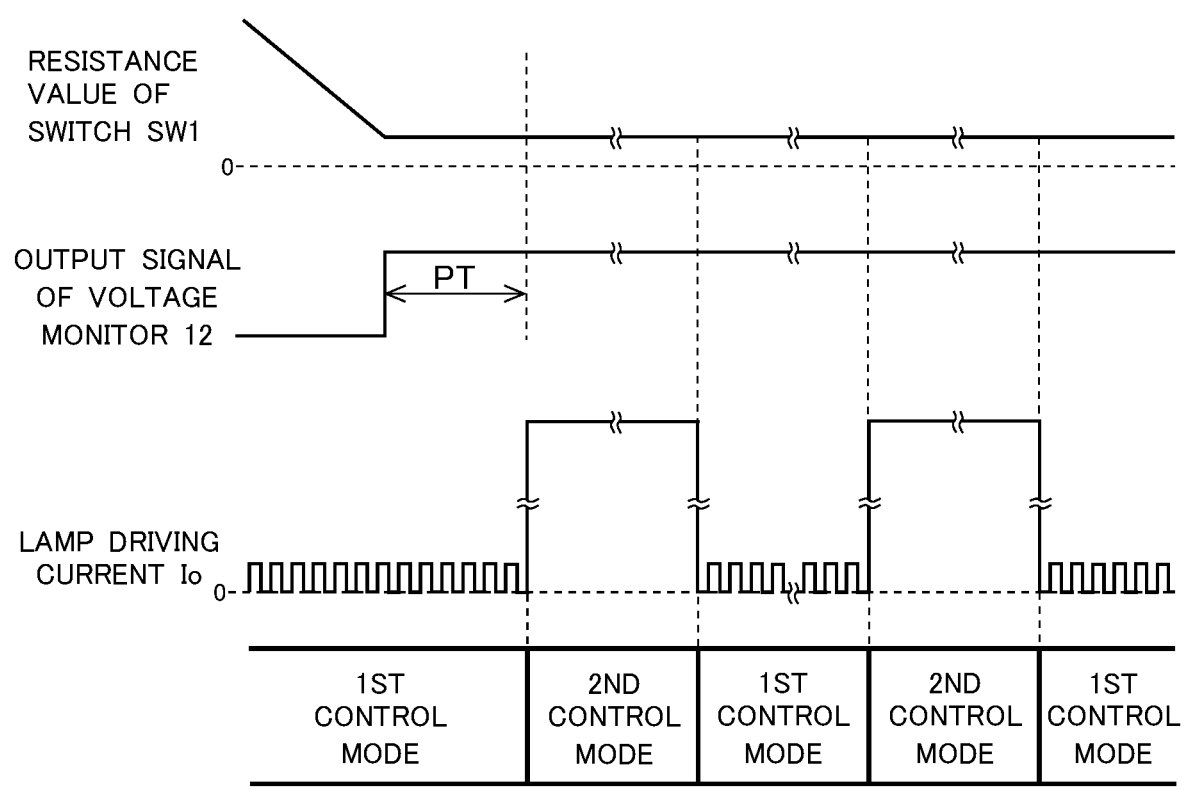
FIG. 3 is a time chart of a lamp driving current.

Next, the operation of the lamp system shown in FIG. 1 will be described with reference to FIG. 3. FIG. 3 is a time chart of the lamp driving current Jo. FIG. 3 shows an example where, in the second control mode, the PMOS transistor 7 is PWM-driven with an on-duty of 100%.

In a case where the common contact c of the switch SW1 is unconnected to either the contact a or the contact b and in addition no leakage path is formed in the switch SW1 due to an external factor such as rain and dust (hereinafter referred to as a "first case"), the resistance value of the switch SW1 is sufficiently high.

Thus, in the first case mentioned above, the voltage fed to the external terminal OUT does not become lower than the first predetermined value.

As described above, the logic circuit 5 does not start switching alternately between the first and second control modes unless the voltage fed to the external terminal OUT becomes lower than the first predetermined value, and thus in the first case mentioned above, the first control mode persists.

In a case where the common contact c of the switch SW1 is unconnected to either the contact a or the contact b and in addition a leakage path is formed in the switch SW1 due to an external factor such as rain and dust (hereinafter referred to as a "second case"), the resistance value of the switch SW1 becomes halfway low.

As described above, the logic circuit 5 does not start switching alternately between the first and second control modes unless the voltage fed to the external terminal OUT becomes lower than the first predetermined value, and thus, also in the second case described above, the first control mode persists.

For example, when the second case mentioned above transits to a state where the common contact c of the switch SW1 is properly connected to the contact a or the contact b, the resistance value of the switch SW1 becomes sufficiently low. This makes the voltage fed to the external terminal OUT lower than the first predetermined value, and the alternate switching between the first and second control modes is started.

In this embodiment, only when the output signal of the voltage monitor 12 having turned to high level is kept at high level for a given period PT, a transition from the first to the second control mode takes place (see FIG. 3).

Figure 4:
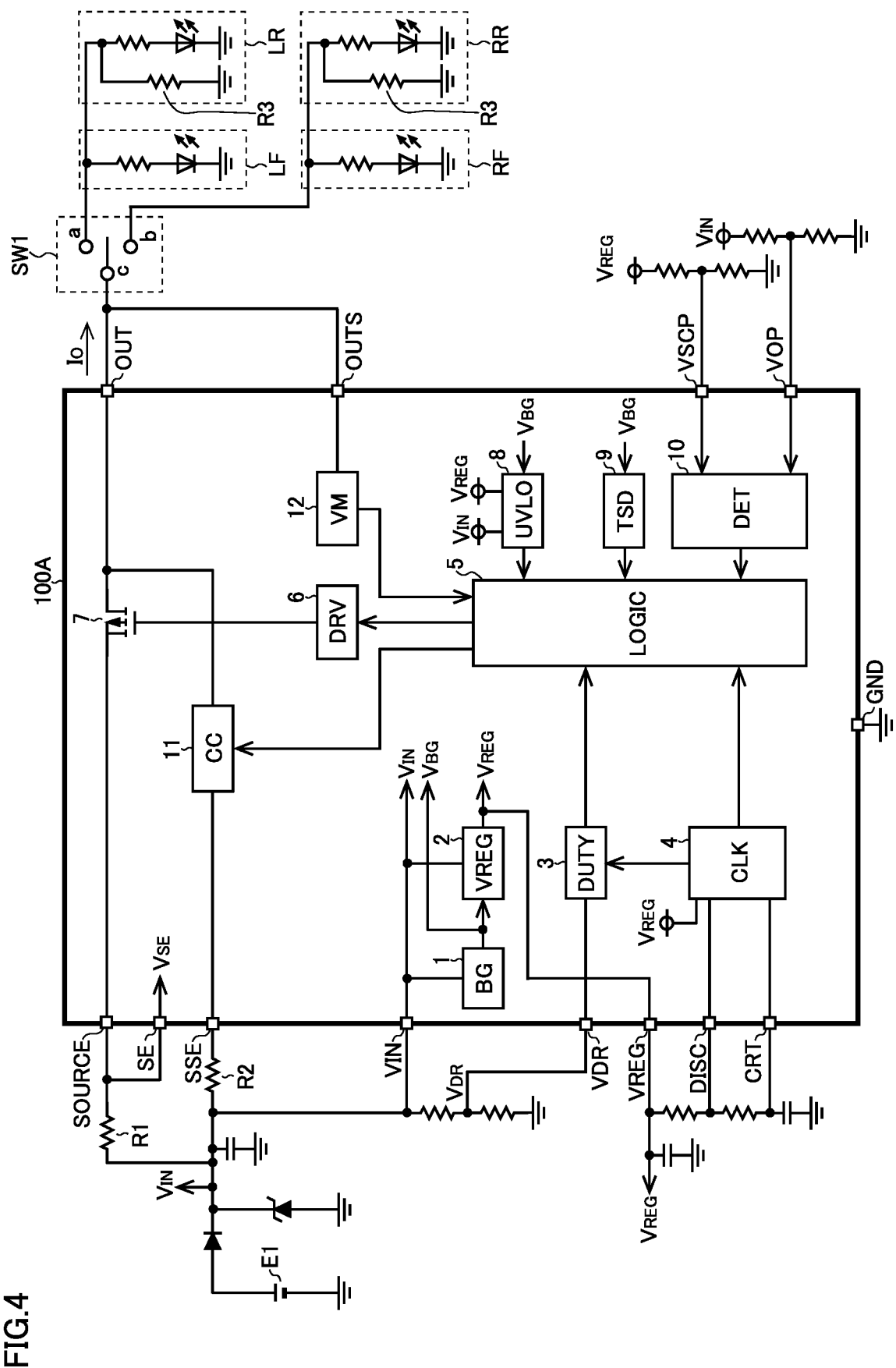
FIG. 4 is a diagram showing a modified example of the lamp system.

Through the operation described above, it is possible to suppress unintended lighting of a lamp due to a leakage current. In the first control mode, the voltage monitored by the voltage monitor 12 is the product of the constant current determined by the constant current circuit 11 and the impedance of the load connected to the output terminal OUT. In the configuration example shown in FIG. 1, due to variation in the forward voltages of LEDs, the impedance of the load connected to the output terminal OUT varies. Thus, for example, as in a modified example shown in FIG. 4, providing a resistor R3 that is connected in parallel with a lamp makes the voltage monitored by the voltage monitor 12 equal to the product of the constant current determined by the constant current circuit 11 and the combined resistance of the switch SW1 and the resistor R3. This makes it possible to accurately suppress false lighting of a lamp due to a leakage current.

As described above, in the first control mode, the logic circuit 5 makes the constant current circuit 11 operate intermittently. This helps reduce electric power consumption when the switch SW1 has the common contact c unconnected to either the contact a or the contact b. This also helps reduce the average current that passes through a lamp when the lamp is unintendedly lit by a leakage current, and thus it is possible to reduce the luminance of the unintendedly lit lamp.

Figure 5:
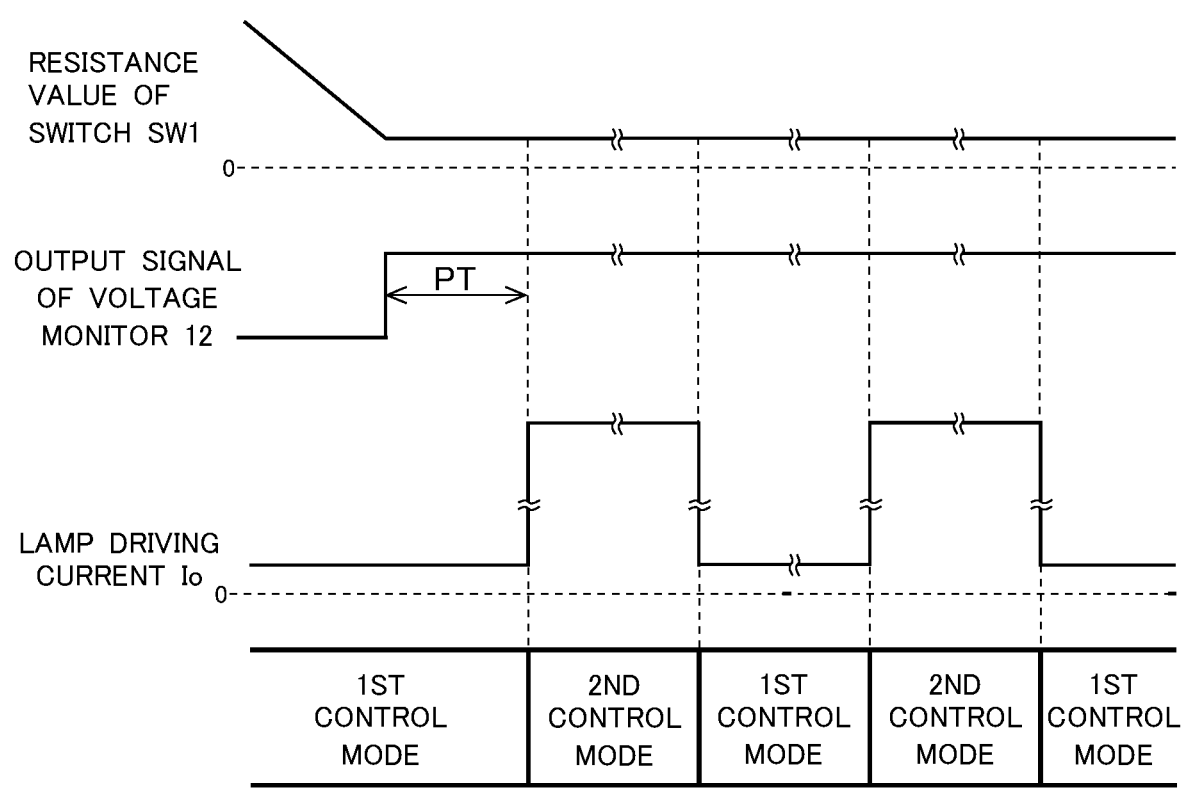
FIG. 5 is another time chart of the lamp driving current.

Although it is less advantageous compared to this embodiment in terms of electric power consumption and the luminance of an unintendedly lit lamp, the constant current circuit 11 can be operated continuously in the first control mode. In this case, the time chart of the lamp driving current $I_O$ is, for example, as shown in FIG. 5.

1-5. Arrangement of External Terminals of the Lamp Control Device

Figure 6:
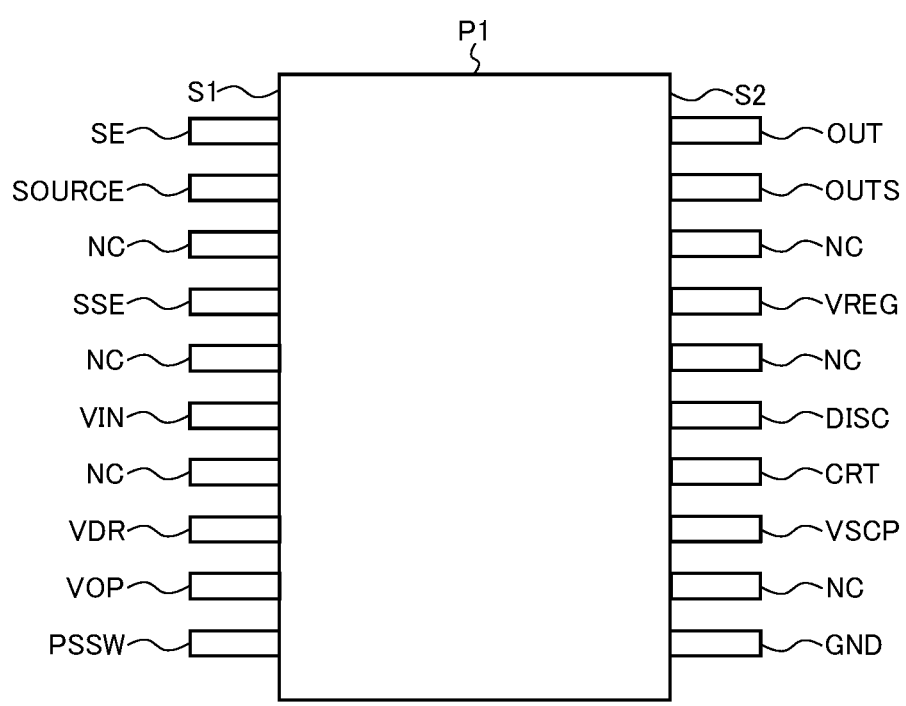
FIG. 6 is an exterior top view of a lamp control device.

FIG. 6 is an exterior top view of the lamp control device 100A, showing an example of the arrangement of the external terminals of the lamp control device 100A. In FIG. 6, such parts as find their counterparts in FIG. 1 are identified by the same reference signs.

Along a first side S1 of a rectangular package P1, there are arranged external terminals SE, SOURCE, NC, SSE, NC, $V_{IN}$, NC, VDR, VOP, and PSSW in this order.

Along a second side S2 of the rectangular package P1 opposite from the first side S1, there are arranged external terminals OUT, OUTS, NC, $V_{REG}$, NC, DISC, CRT, VSCP, NC, and GND in this order. As in this example of arrangement, it is preferable that the external terminals OUT and OUTS be provided on the same side of the rectangular package. Also, it is preferable that no other external terminals be present between the external terminals OUT and OUTS. This makes it easy to connect the switch SW1 with the external terminal OUT or OUTS.

The external terminals NC are terminals that are unconnected to the internal circuit of the rectangular package P1. The external terminal PSSW is, though omitted from illustration in FIG. 1 and other drawings, a terminal for reducing current consumption in a stand-by mode by being connected to, instead of the ground of the division voltage, the low-side (low-potential side) of the division voltage.

1-6. Vehicle (Motorcycle)

Figure 7:
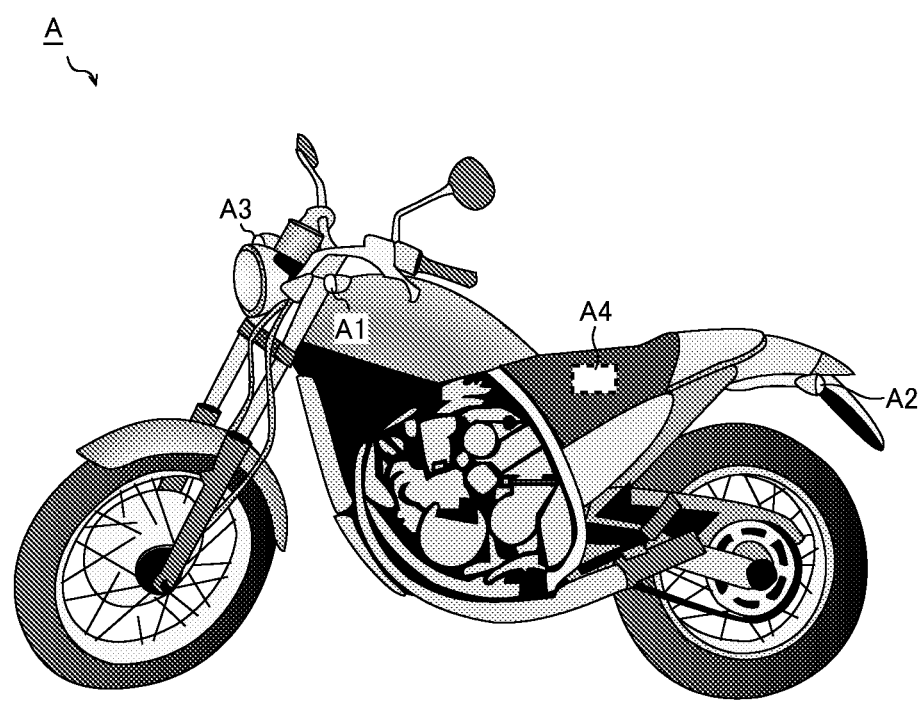
FIG. 7 is an exterior view of a motorcycle.

FIG. 7 is an exterior view of a motorcycle. The motorcycle A in FIG. 7 is a kind of vehicle referred to as what is called a medium-sized two-wheeled vehicle (corresponding to a standard motorcycle classified into the vehicle category with a displacement of more than 50 cc but no more than 400 cc in the Japanese Road Traffic Act). The motorcycle A includes a flasher lamp A1 that is provided at the left front of the motorcycle, a flasher lamp A2 that is provided at the left rear of the motorcycle, a flasher lamp that is provided at the right front of the motorcycle (unillustrated in FIG. 7), a flasher lamp A3 that is provided at the right rear of the motorcycle, and a battery A4 as their power source.

It should be noted that, for the sake of convenient illustration, the flasher lamps A1 to A3 and the battery A4 may actually be arranged elsewhere than they are shown to be arranged in FIG. 7.

The lamp control device 100A described above can be suitably used as a device for controlling the lighting of the flasher lamps on the motorcycle A. When the lamp control device 100A described above is used as a device for controlling the lighting of the flasher lamps on the motorcycle A, the switch SW1 shown in FIG. 1 serves as a flasher switch that is operated by a driver of the motorcycle A.

1-7. Other Modified Examples of the First Embodiment

Although the first embodiment described above deals with a configuration example where LEDs are used as lamps, it is also possible to use, for example, halogen lamps, xenon lamps, organic EL (electroluminescence) elements, or the like.

Figure 8:
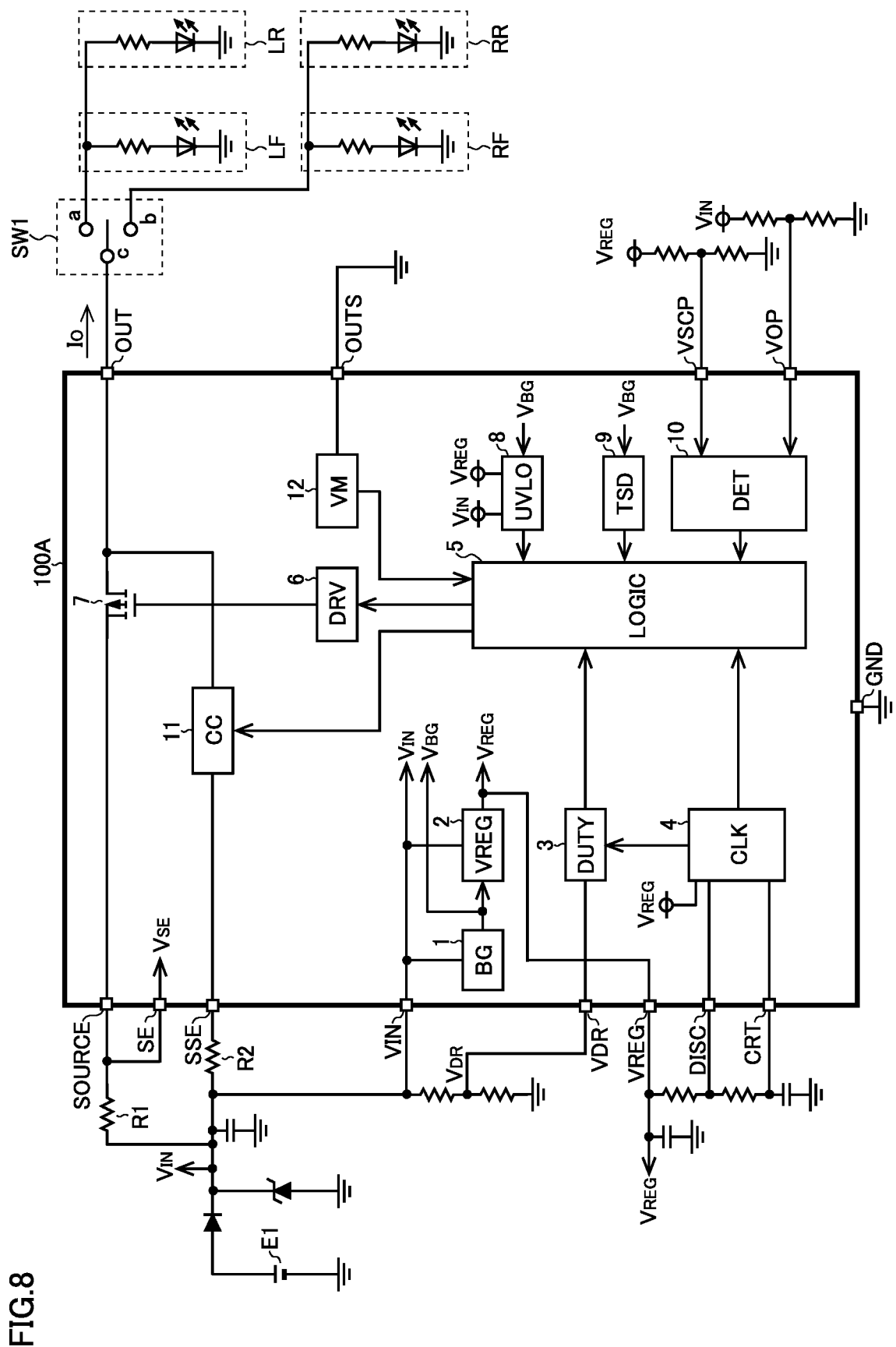
FIG. 8 is a diagram showing a modified example of the lamp system.

In an application where, with consideration given to the performance of the switch SW1 and the like, a leakage current can safely be ignored completely, the lamp system shown in FIG. 8 can be configured using the lamp control device 100A. In the lamp system shown in FIG. 8, the external terminal OUTS is connected to the ground potential. This keeps the output signal of the voltage monitor 12 at high level regardless of the voltage fed to the external terminal OUT. That is, the voltage monitor 12 is in a disabled state and thus does not monitor the voltage that is fed to the external terminal OUT.

In the lamp system shown in FIG. 8, the fault detector 10 has a function of detecting, when the difference between the voltage fed to the external terminal VIN and the voltage fed to the external terminal VSE is equal to or lower than a predetermined value, that is, when the current passing through the resistor R1 is equal to or lower than a threshold value, a state where the common contact c of the switch SW1 is unconnected to either the contact a or the contact b.

When the fault detector 10 detects a state where the common contact c of the switch SW1 is unconnected to either the contact a or the contact b, even if the logic circuit 5 is in the second control mode, a transition from the second to first mode takes place at a time point for switching that is based on the clock signal. Thus, when the common contact c of the switch SW1 is unconnected to either the contact a or the contact b, the second control mode only persists for one period of the clock signal at most.

On the other hand, when the common contact c of the switch SW1 is connected to either the contact a or the contact b, the difference between the voltage fed to the external terminal VIN and the voltage fed to the external terminal VSE is higher than the predetermined value, and thus the fault detector 10 does not detect a state where the common contact c of the switch SW1 is unconnected to either the contact a or the contact b. Thus, the logic circuit 5 switches alternately between the first and second control modes.

The various technical features disclosed herein may be implemented in any other manner than in the first embodiment described above, and allow for many modifications without departing from the spirit of the present invention. That is, the first embodiment described above should be understood to be in every aspect illustrative and not restrictive. The scope of the present invention is defined not by the description of the embodiments given above but by the appended claims, and should be understood to encompass any modifications made in the sense and scope equivalent to those of the claims.

2. Second Embodiment

2-1. Configuration of the Lamp System

Figure 9:
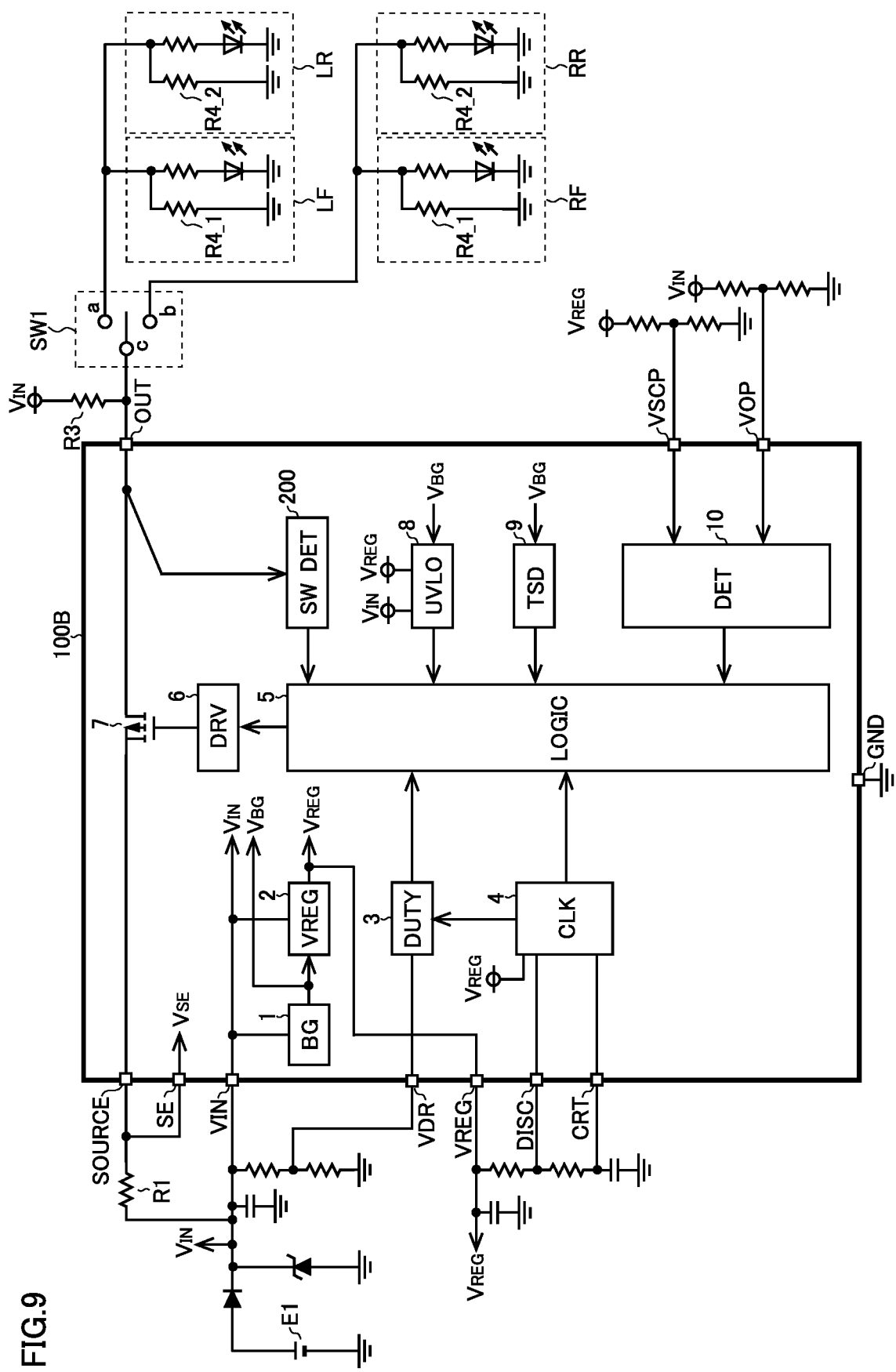
FIG. 9 is a diagram showing another configuration example of the lamp system.

FIG. 9 is a diagram showing another configuration example of a lamp system. In FIG. 9, such parts as find their counterparts in FIG. 1 are identified by common reference signs, and no overlapping description will be repeated. The lamp system of this configuration example includes a lamp control device 100B and externally fitted components which are externally connected to the lamp control device 100B. The externally fitted components include a resistor R3, a switch SW1, a left-front lamp module LF, a left-rear lamp module LR, a right-front lamp module RF, and a right-rear lamp module RR. The lamp modules each include an LED. Although FIG. 9 shows a configuration where each lamp module includes one LED, a configuration is also possible where each lamp module includes a plurality of LEDs. The specific configuration example of the left-front lamp module LF, the left-rear lamp module LR, the right-front lamp module RF, and the right-rear lamp module RR in this embodiment is different from the specific configuration example of those in the first embodiment.

The lamp control device 100B is a semiconductor integrated circuit device (what is called an LED driver IC) which receives a voltage fed from a battery E1 to feed an output current to each lamp module, and includes a plurality of external terminals for establishing electrical connection with outside the device.

The lamp control device 100B, unlike the lamp control device 100A described in connection with the first embodiment, includes no external terminal SSE.

One terminal of the resistor R3 and a common contact c of the switch SW1 are connected to the external terminal OUT. The external terminal OUT is an output terminal via which to output a lamp driving current. The other terminal of the resistor R3 is fed with the input voltage $V_{IN}$. A contact a of the switch SW1 is connected to the left-front and left-rear lamp modules LF and LR. A contact b of the switch SW1 is connected to the right-front and right-rear lamp modules RF and RR.

Thus, to turn on the left-front and left-rear lamp modules LF and LR, the switch SW1 needs to be operated in advance so as to connect together the common contact c and the contact a. Likewise, to turn on the right-front and right-rear lamp modules RF and RR, the switch SW1 needs to be operated in advance so as to connect together the common contact c and the contact b. Unless operated, the switch SW1 has the common contact c unconnected to either the contact a or the contact b as shown in FIG. 9.

The left-front and right-front lamp modules LF and RF each include a resistor R4_1 which is connected in parallel with a series circuit of a current limiting resistor and an LED. The left-rear and right-rear lamp modules LR and RR each include a resistor R4_2 which is connected in parallel with a series circuit of a current limiting resistor and an LED.

2-2. Internal Configuration of the Lamp Control Device

With reference still to FIG. 9, the internal configuration of the lamp control device 100B will be described. The lamp control device 100B has integrated in it a band-gap reference voltage generator 1, a constant voltage generator 2, a duty controller 3, a clock generator 4, a logic circuit 5, a driver 6, a PMOS transistor 7, an undervoltage malfunction preventer 8, an overheat protector 9, a fault detector 10, and a state detector 200.

The band-gap reference voltage generator 1 generates a reference voltage $V_{BG}$ using the input voltage $V_{IN}$ that is fed to the external terminal VIN, to feed the reference voltage $V_{BG}$ to different parts in the lamp control device 100B.

The constant voltage generator 2 generates a constant voltage $V_{REG}$ using the reference voltage $V_{BG}$, to feed the constant voltage $V_{REG}$ to different parts in the lamp control device 100B.

When performing blinking control for a lamp, the logic circuit 5 alternates between a first control mode (extinguishing control), in which it keeps the MOS transistor 7 off during a period corresponding to M periods of the clock signal, and a second control mode (lighting control), in which it switches the MOS transistor 7 on and off in accordance with the PWM signal during a period corresponding to N periods of the clock signal. M and N mentioned above are each a natural number of two or more. M and N mentioned above may equal, or may be different.

The state detector 200 senses the state of the switch SW1. Specifically, the state detector 200 checks whether the resistance value of the switch SW1 is lower than a predetermined value and notifies the logic circuit 5 of the checking result.

2-3. Configuration of the State Detector

First Configuration Example

Figure 10:
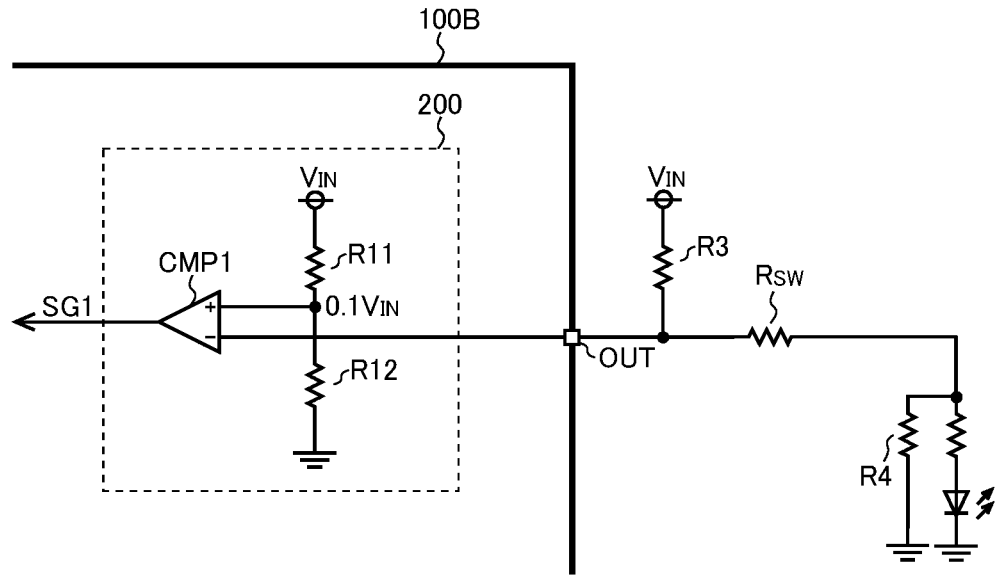
FIG. 10 is a diagram showing a first configuration example of a state detector.

FIG. 10 is a diagram showing a first configuration example of the state detector 200. In FIG. 10, such parts as find their counterparts in FIG. 9 are identified by the same reference signs. The state detector 200 of this configuration example includes a resistor R11, a resistor R12, and a comparator CMP1.

One terminal of the resistor R11 is fed with the input voltage $V_{IN}$. The other terminal of the resistor R11 and one terminal of the resistor R12 are connected to the non-inverting input terminal of the comparator CMP1. The other terminal of the resistor R12 is fed with the ground potential. The external terminal OUT is connected to the inverting input terminal of the comparator CMP1.

A division voltage of the input voltage $V_{IN}$ is fed to the inverting input terminal of the comparator CMP1. The ratio of the resistance value of the resistor R11 to the resistance value of the resistor R12 is set at 9. Thus, as shown in FIG. 10, 0.1 $V_{IN}$ is fed to the non-inverting input terminal of the comparator CMP1. That is, formula (1) below holds. Here, V+ represents the voltage fed to the non-inverting input terminal of the comparator CMP1.

$$V_{+}=0.1 \times V_{IN} \quad (1)$$

In a state where no lamp is lit, formula (2) below holds. Here, V− represents the voltage that is fed to the inverting input terminal of the comparator CMP1, $R_3$ represents the resistance value of the resistor R3, $R_4$ represents the combined resistance value of the resistor R4_1 in the left-front lamp module LF (see FIG. 9) and the resistor R4_2 in the left-rear lamp module LR (see FIG. 9) or the combined resistance value of the resistor R4_1 in the right-front lamp module RF (see FIG. 9) and the resistor R4_2 in the right-rear lamp module RR (see FIG. 9), and $R_{SW}$ represents the resistance value of the switch SW1.

$$V_{-}=V_{IN} \times (R_{SW}+R_4)/(R_{SW}+R_3+R_4) \quad (2)$$

The condition under which the output signal SG1 of the comparator CMP1 is at high level is given by formula (3) below. Substituting formulae (1) and (2) above in formula (3) below and rearranging the result gives formula (4) below.

$$V_{-} < V_{+} \quad (3)$$

$$V_{IN} \times (R_{SW}+R_4)/(R_{SW}+R_3+R_4) < 0.1 \times V_{IN}$$

$$R_{SW} < (R_3/9) - R_4 \quad (4)$$

When the switch SW1 is operated so as to connect together the common contact c of the switch SW1 and the contact a or the contact b, the resistance value $R_{SW}$ of the switch SW1 substantially equals zero. Thus formula (4) above holds, and the output signal SG1 of the comparator CMP1 is at high level.

On the other hand, when a leakage current passes through the switch SW1, the resistance value $R_{SW}$ of the switch SW1 is high to a certain degree. Thus, the resistance value $R_3$ and the combined resistance value $R_4$ are set such that, when a leakage current passes through the switch SW1, formula (4) above does not hold. In other words, it is possible to adjust the sensitivity of leakage current detection through the setting of the resistance value $R_3$ and the combined resistance value $R_4$.

Both the voltage V+ fed to the non-inverting input terminal of the comparator CMP1 and the voltage V− fed to the inverting input terminal of the comparator CMP1 are voltages that depend on the input voltage $V_{IN}$, and thus variation of the input voltage $V_{IN}$ cannot be an error factor in leakage current detection.

An error factor in leakage current detection is "9" in the formula (4) above. That is, an error in leakage current detection is about as large as an error in the voltage division ratio of the voltage divider circuit composed of the resistors R11 and R12. Thus, the state detector 200 of this configuration example can detect a leakage current in the switch SW1 more accurately than the lamp control device proposed in Patent Document 1.

By inhibiting the lighting of a lamp when the output signal SG1 of the comparator CMP1 is at low level, it is possible to accurately suppress unintended lighting of the lamp due to a leakage current.

As the voltage fed to one terminal of the resistor R3 and one terminal of the resistor R11, it is possible to use, for example, the constant voltage $V_{REG}$ instead of the input voltage $V_{IN}$.

Second Configuration Example

Figure 11:
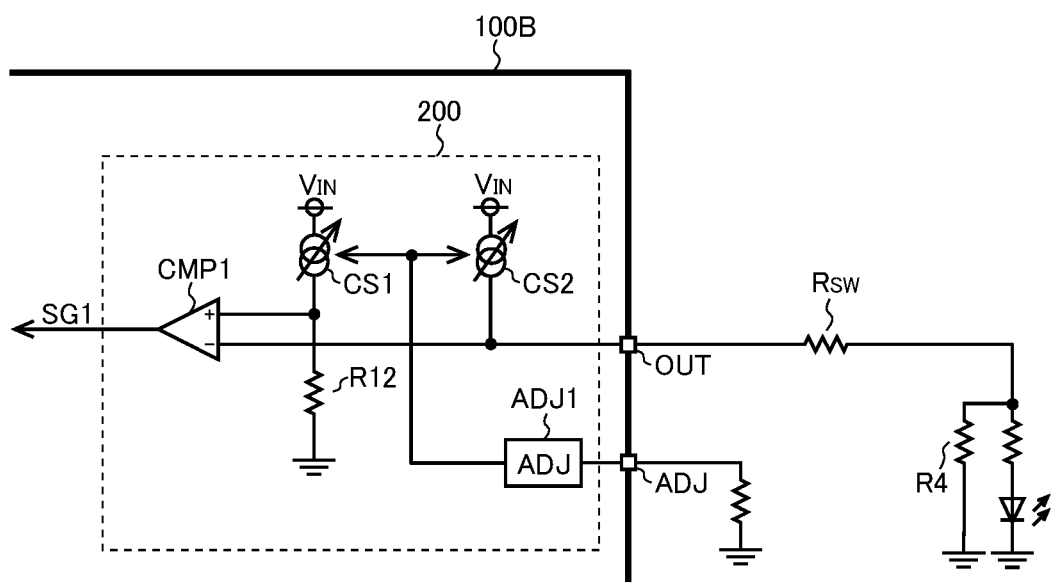
FIG. 11 is a diagram showing a second configuration example of the state detector.

FIG. 11 is a diagram showing a second configuration example of the state detector 200. In FIG. 11, such parts as find their counterparts in FIG. 10 are identified by the same reference signs. The state detector 200 of this configuration example is different from that of the first configuration example in that it includes a constant current source CS1 instead of a resistor R11 and that it further includes a constant current source CS2 and an adjustment circuit ADJ1. In other respects, the state detector 200 of this configuration example is identical with that in the first configuration example.

When the state detector 200 of this configuration example is adopted, as shown in FIG. 11, no resistor R3 is connected to the external terminal OUT.

The supply voltage to the constant current sources CS1 and CS2 is the input voltage $V_{IN}$. It is possible to use a constant voltage $V_{REG}$ instead of the input voltage $V_{IN}$ as the supply voltage to the constant current sources CS1 and CS2. The constant current source CS2 feeds a constant current to the external terminal OUT.

The adjustment circuit ADJ1, in accordance with the value of a resistor that is connected to the external terminal ADJ, adjusts the ratio of the value of the constant current fed from the constant current source CS2 to the value of the constant current fed from the constant current source CS1. It is possible to adjust the sensitivity of leakage current detection through the setting of the ratio of the value of the constant current fed from the constant current source CS2 to the value of the constant current fed from the constant current source CS1 and the combined resistance value $R_4$.

An error in leakage current detection is about as large as an error in the ratio of the value of the constant current fed from the constant current source CS2 to the value of the constant current fed from the constant current source CS1. Thus, the state detector 200 of this configuration example can detect a leakage current in the switch SW1 more accurately than the lamp control device proposed in Patent Document 1.

2-4. Vehicle (Motorcycle)

The lamp control device 100B described above, like the lamp control device 100A described above, can be suitably used as a device for controlling the lighting of the flasher lamps on a motorcycle A shown in FIG. 7 described above. When the lamp control device 100B described above is used as a device for controlling the lighting of the flasher lamps on the motorcycle A, the switch SW1 shown in FIG. 9 serves as a flasher switch that is operated by a driver of the motorcycle A.

2-5. Other Modified Examples of the Second Embodiment

Although the second embodiment described above deals with a configuration example where LEDs are used as lamps, it is also possible to use, for example, halogen lamps, xenon lamps, organic EL elements, or the like.

The logic levels of the output signal SG1 can be reversed compared with those in the second embodiment described above.

The resistor R3 can be incorporated in the lamp control device 100B. However, from the perspective of achieving more flexibility in the adjustment of the leakage current detection sensitivity, it is preferable that the resistor R3 be an externally fitted component as in the second embodiment described above.

The various technical features disclosed herein may be implemented in any other manner than in the second embodiment described above, and allow for many modifications without departing from the spirit of the present invention. That is, the second embodiment described above should be understood to be in every aspect illustrative and not restrictive. The scope of the present invention is defined not by the description of the second embodiment given above but by the appended claims, and should be understood to encompass any modifications made in the sense and scope equivalent to those of the claims.

LIST OF REFERENCE SIGNS 100A, 100B lamp control device
11 constant current circuit
12 voltage monitor
200 state detector
CMP1 comparator
OUT output terminal (external terminal)
R1, R2, $R_{SW}$ resistor
A motorcycle (vehicle)

The invention claimed is:
1. A lamp control device comprising:
a first input terminal;
a second input terminal;
an output terminal configured to be connectable to a lamp via an external switch, a driving current for the lamp being output via the output terminal;
an internal switch arranged on a first path connecting together the first input terminal and the output terminal;
a constant current circuit arranged on a second path connecting together the second input terminal and the output terminal;

a voltage monitor configured to monitor a voltage fed to the output terminal; and a controller configured to control the internal switch based on a result of monitoring by the voltage monitor, wherein the controller is configured to start switching alternately between first and second control modes when the voltage fed to the output terminal is lower than a first predetermined value.

2. The lamp control device according to claim 1, wherein the controller is configured to, after starting switching alternately between the first and second control modes, when the voltage fed to the output terminal becomes higher than a second predetermined value, finish switching alternately between the first and second control modes and fix the control mode to the first control mode.

3. The lamp control device according to claim 2, wherein the second predetermined value is higher than the first predetermined value.

4. The lamp control device according to claim 1, wherein the controller is configured to drive the internal switch by PWM in the second control mode.

5. The lamp control device according to claim 1, wherein the controller is configured to make the constant current circuit operate intermittently in the first control mode.

6. The lamp control device according to claim 1, wherein the controller is configured to keep the constant current circuit out of operation in the second control mode.

7. A lamp system comprising:
the lamp control device according to claim 1;
the external switch; and
the lamp.

8. The lamp system according to claim 7, further comprising first and second resistors,
wherein the lamp system is operable such that an input voltage is fed to one terminal of the first resistor and to one terminal of the second resistor,
another terminal of the first resistor is connected to the first input terminal,
another terminal of the second resistor is connected to the second input terminal, and
a resistance value of the second resistor is higher than a resistance value of the first resistor.

9. A vehicle comprising:
the lamp system according to claim 7; and
a battery as a power source for the lamp system.

10. The vehicle according to claim 9,
wherein
the vehicle is a motorcycle,
the switch is a flasher switch, and
the lamp is a flasher lamp.

11. A lamp system comprising:
a lamp control device;
an external switch;
a lamp; and
first and second resistors,
wherein the lamp control device comprises:
a first input terminal;
a second input terminal;
an output terminal configured to be connectable to the lamp via the external switch, a driving current for the lamp being output via the output terminal;
an internal switch arranged on a first path connecting together the first input terminal and the output terminal;
a constant current circuit arranged on a second path connecting together the second input terminal and the output terminal;
a voltage monitor configured to monitor a voltage fed to the output terminal; and
a controller configured to control the internal switch based on a result of monitoring by the voltage monitor,
wherein the lamp system is operable such that an input voltage is fed to one terminal of the first resistor and to one terminal of the second resistor,
another terminal of the first resistor is connected to the first input terminal,
another terminal of the second resistor is connected to the second input terminal, and
a resistance value of the second resistor is higher than a resistance value of the first resistor.

12. A vehicle comprising:
the lamp system according to claim 11; and
a battery as a power source for the lamp system.

13. The vehicle according to claim 12, wherein:
the vehicle is a motorcycle,
the switch is a flasher switch, and
the lamp is a flasher lamp.

* * * * *